United States Patent [19]

Hashimoto et al.

[11] Patent Number: 4,886,529

[45] Date of Patent: Dec. 12, 1989

[54] POLISHING ROBOT AND POLISHING METHOD USING THE SAME

[75] Inventors: Toshio Hashimoto; Minoru Nakafuji, both of Amagasaki, Japan

[73] Assignee: Showa Precision Machinery Co., Ltd., Amagasaki, Japan

[21] Appl. No.: 216,555

[22] Filed: Jul. 8, 1988

[51] Int. Cl.[4] .............................................. B24B 49/00
[52] U.S. Cl. ............................... 51/165.71; 51/165.81; 51/60; 901/16; 901/24
[58] Field of Search ..................... 51/165.71, 165.8, 57, 51/58, 59, 60; 901/15, 16, 17, 18, 24

[56] References Cited

U.S. PATENT DOCUMENTS 4,502,830  3/1985  Inaba et al. .......................... 901/17
4,570,385  2/1986  Richter et al. ..................... 51/165.71

Primary Examiner—Robert P. Olszewski
Assistant Examiner—Maurina Rachuba
Attorney, Agent, or Firm—Millen, White & Zelano

[57] ABSTRACT

A direct-teaching playback type polishing robot comprising a first arm and a second arm, a polishing tool suspended from a free end of said second arm, horizontal high-lead ball screws having nuts connected to said arms, respectively, and a servo-motor and an encoder mounted at a free end of threaded shaft of each of said ball screws in such a manner that rotation of said servo-motor advancing the corresponding nut to swing the corresponding arm independently of the other arm.

8 Claims, 6 Drawing Sheets (A)  (B)

(A)  (B)

POLISHING ROBOT AND POLISHING METHOD USING THE SAME

BACKGROUND OF THE INVENTION

1. Field of the Invention

The present invention relates to a polishing robot and a polishing method using the robot.

2. Brief Description of the Prior Art

The polishing robot of the type relevant to the present invention has been disclosed in Japanese Laid-open Patent Application KOKAI 60-108262 (1985). This is a two-arm articulated robot comprising a first arm swingable about an axis, a second arm swingable about a free end of said first arm, a microvibrating polishing tool suspended at a free end of said second arm, each of said first and second arms being driven by a servo-motor which is controlled for normal or reverse rotation within a predetermined angular range to reciprocate the corresponding arm within the necessary angular range, thereby positioning the polishing tool and causing the tool to polish the surface of a workpiece such as a metal mold.

However, in the conventional robot of this type, the small servo-motors used for driving the first and second arms require some amount of torque for moving the arms and, hence, call for the interposition of speed reducers. When the arms are designed to be lengthy, however, the backlash of such servo-motor causes rattlings of the arm end which are of the order of several millimeters at the maximum so that on playback, the accuracy of polishing is sacrificed.

Generally, the action of an industrial robot follows the sequence of teaching—memory—playback and the locus of action, speed of action, and acceleration/deceleration characteristic are important factors. For this reason, usually the continuous path (CP) control mode or the point-to-point (PTP) control mode is utilized. The former CP control mode includes a direct teaching system in which the operator actually manipulates the industrial robot to let it memorize the coordinates of points to be scanned for continuous positioning for playback. In this system, such other conditions as speed of action can also be taught. For example, relating to such a direct teaching system, it has been proposed to compute the required playback speed by providing a means of generating direction data indicating the direction of movement of the tool in addition to the means of generating data indicating the position of the tool, storing these data by sampling lock at predetermined intervals and selecting the speed of playback based on the amount of change in stored position data and the change in direction data (Japanese Patent Application KOKAI 60-124706 (1985).

However, while the direct teaching system is generally a convenient system which does not require a program and the like, the teaching by the operator is difficult when the area to be polished is large.

SUMMARY OF THE INVENTION

In accordance with the present invention, there is provided a direct-teaching playback type polishing robot comprising a first arm and a second arm, a polishing tool suspended from a free end of said second arm, horizontal high-lead ball screws having nuts connected to said arms, respectively, and a servo-motor and an encoder mounted at a free end of a threaded shaft of each of said ball screws in such a manner that rotation of said servo-motor advancing the corresponding nut to swing the corresponding arm independently of the other arm.

In another aspect, the present invention provides a polishing robot wherein said first and second arms and said high-lead ball screws connected to said arms, respectively, are mounted on a vertically slidable slide member.

In a third aspect, the present invention provides a method of polishing a workpiece by means of a direct teaching type polishing robot which comprises the steps of the operator holding a free end of an arm of the robot in the vicity of a polishing tool mounted at said free end and teaching the outline or peripheral points of the surface of said workpiece to be polished and causing the robot to playback the information taught within the range of teaching according to a simple program computing the direction of linear movement of the grinding tool, pitch between adjoining straight lines of movement and the speed of movement of the tool.

DETAILED DESCRIPTION OF THE INVENTION

Figure 1:
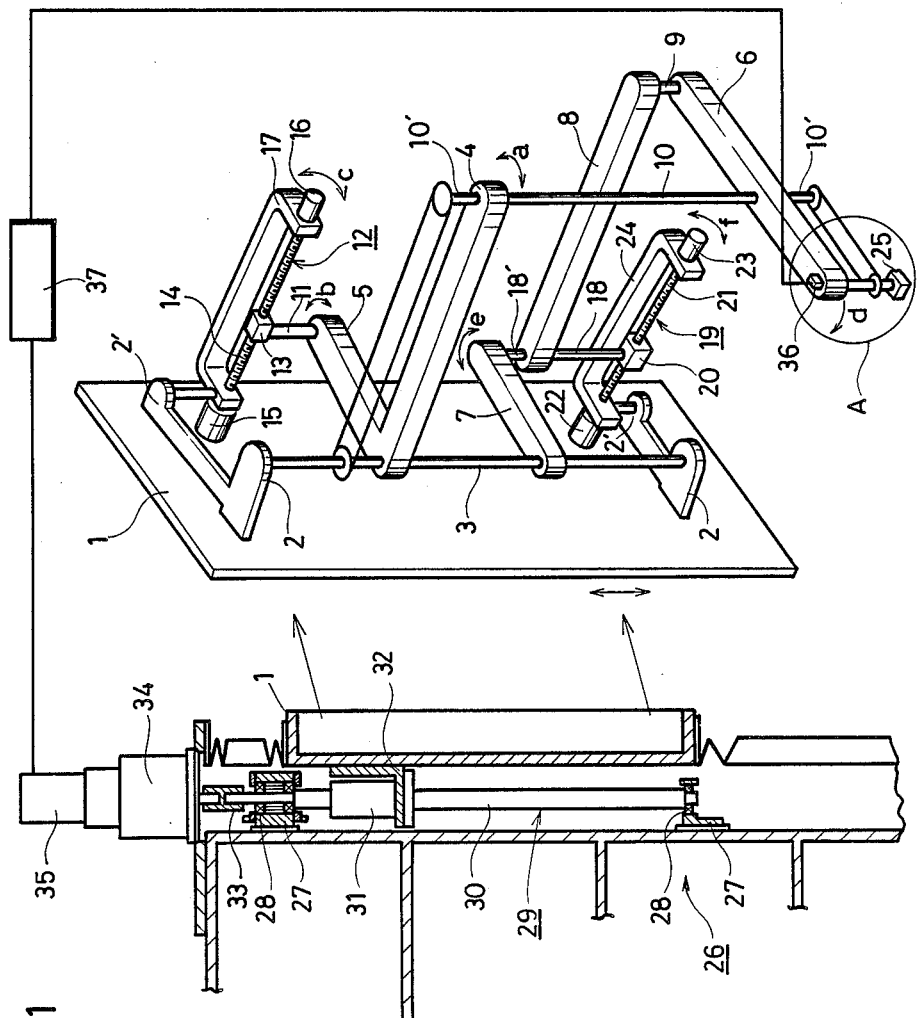
FIG. 1 is a disassembled view showing an embodiment of the robot according to the invention.

Referring to FIG. 1, a robot body 26 is provided with a vertically slidable slide member 1 on a side thereof and a cardinal shaft 3 is rigidly secured to a couple of top and bottom projecting brackets 2 disposed on the front surface of said slide member 1. Rotatably mounted on said cardinal shaft 3 is a first arm 4 in an upper position and a first lever 5 inegral with first arm 4 is extending from the base of the same arm. Rotatably mounted on said cardinal shaft 3 in a lower position is a first link 7 for rocking a second arm 6. Rotatably connected to the free end of said second lever 7 is a second link 8 through a top second lever pin 18', and the base of said second arm 6 is rotatably connected to the free end of the second link 8 through a connecting pin 9. The free end of said first arm 4 is rotatably connected to the approximate center of the second arm 6 through an arm pin or support rod 10.

Through a first lever pin 11, the free end of a first lever 5 is rotatably connected to a nut 13 of a first high-lead ball screw 12. Connected to one end of a threaded shaft 14 of said first high-lead ball screw 12 is a first servo-motor 15 through a clutch means (not shown), while a first encoder 16 is connected to the other end. The servo-motor 15 and encoder 16 are supported by a bracket 17 which is swingably supported by a projecting bracket 2' extending from said bracket 2.

The free end of said second lever 7 is rotatably connected to a nut 20 of a second high-lead ball screw 19 through a second lever pin 18. A threaded shaft 21 of the second high-lead ball screw 19 is connected to a second servo-motor 22 at one end thereof through a clutch means (not shown) and a second encoder 23 at the other end. The servo-motor 22 and encoder 23 are supported by a bracket 24, which is swingably supported by a projecting bracket 2' of said bottom bracket 2.

The reference numeral 25 represents a polishing tool suspended from the free end of the second arm 6, which polishing tool 25 is adapted to undergo microvibration in response to a polishing tool motor not shown.

The first arm 4 and second arm 6 being constructed as above, the operator sets the vertical slide 1 in a suitable position and teaches the robot via encoders 16 and 23 by manipulating the polishing tool 25 along the outline or points (which will be explained hereinafter) of the surface of a metal mold B for molding of plastic parts. In this maneuvor, the first arm 4 and/or the second arm 6 is swung as indicated by the arrowmark a, d (the swing angle $a = \theta_1$, the base 3 serves as $\theta_1$ axis; the swing angle $d = \theta_2$, the arm pin 10 is the $\theta_2$ axis). For example, when the first arm 4 is swung as indicated by arrowmark a, the first lever 5 is simultaneously swung as indicated by arrowmark b, so that the bracket 17 is given some rotation in the direction of arrowmark C to advance the nut 13 which, in turn, rotates the threaded shaft 14 to drive the first encoder 16. Since the ball screw 12 is of the high lead type, the nut 13 advances in response to a slight actuating force.

Then, as a memory reader switch available on a control panel (not shown) is turned on, the first and second high-lead ball screws 12, 19 are rotated normal or reverse simultaneously or independently by the first and second servo-motors 15 and 22. For example, when the threaded shaft 14 of the first high-lead ball screw 12 is rotated, the nut 13 advances, accompanied by some swing of the threaded shaft 14 as indicated by arrowmark C. As a result, the first lever 5 is swung, whereupon the first arm 4 swings in the direction of arrowmark a and stops in a given position. Then, as the threaded shaft 21 of the second high-lead ball screw 19 is rotated, the nut 20 advances, accompanied by some rotation of the threaded shaft 21 as indicated by arrowmark f. As a result, the second lever 7 swings, whereby the second arm 6 is swung through the connecting lever 8 to bring and stop the polishing tool 25 in a given position, so that the microvibrating polishing tool 25 polishes the surface of the metal die 25.

While the aforementioned slide member 1 is slidable up and down with respect to the robot body 26, the mechanism for effecting the sliding motion is as follows. Thus, the robot body 26 is laterally provided with bearing brackets 27 and 27, on which a ball screw 29 is mounted via bearings 28, 28. Threaded onto a threaded shaft 30 of the ball screw 29 is a nut 31, to which the aforementioned vertical slide 1 is rigidly secured through an L-shaped member 32. Connected to the top end of said threaded shaft 30 are a third servo-motor 34 and a third encoder 35 through a joint 33.

Figure 2:
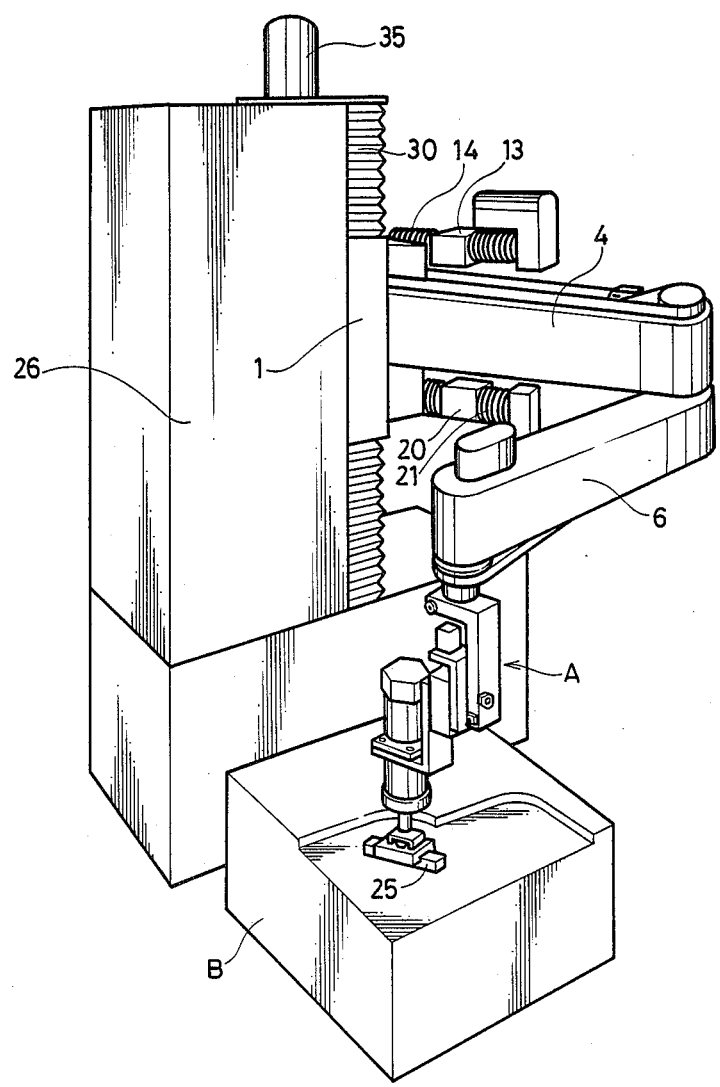
FIG. 2 is a perspective view showing the robot of FIG. 1.

Referring, further, to FIG. 1, the reference numerals 36 and 37 represent a sensor and a controller, respectively, and details of the part indicated by A are shown, as pointed out by arrowmark A, in FIG. 2.

Figure 3:
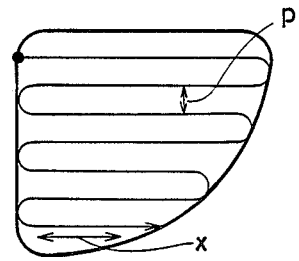
FIG. 3a and 3b are diagrams illustrating the playback routine for the robot on the outline teaching mode.
Figure 3:
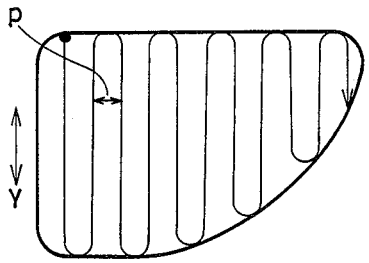

The teaching method applicable to the above-described polishing robot according to the invention may be a simple program input method. Referring, first, to the outline-teaching system as a first embodiment of the invention, it is not that the entire surface to be polished is taught to the robot but that the area to be polished is taught by tracing its peripheral surface (outline) (the operator holds the robot arm end and causes the polishing tool 25 to trace the peripheral surface of the part to be polished). Then, for playback, the operator simply sets the direction of movement (X or Y), the pitch P between adjacent straight lines and the speed of movement on a control panel, whereby the polishing tool 25 moves in such a manner as painting out a blank area as shown in FIG. 3A and FIG. 3B, thereby polishing the surface of the metal mold B.

In this teaching mode, the direction perpendicular to the X-Y plane of the metal mold B is coped with as follows. The force of contact of the polishing tool 25 against the metal mold 25 is detected by a sensor 36 illustrated in FIG. 1 and the third servo-motor 34 is driven and controlled through the controller so that the force of contact will be constant.

Figure 5A:
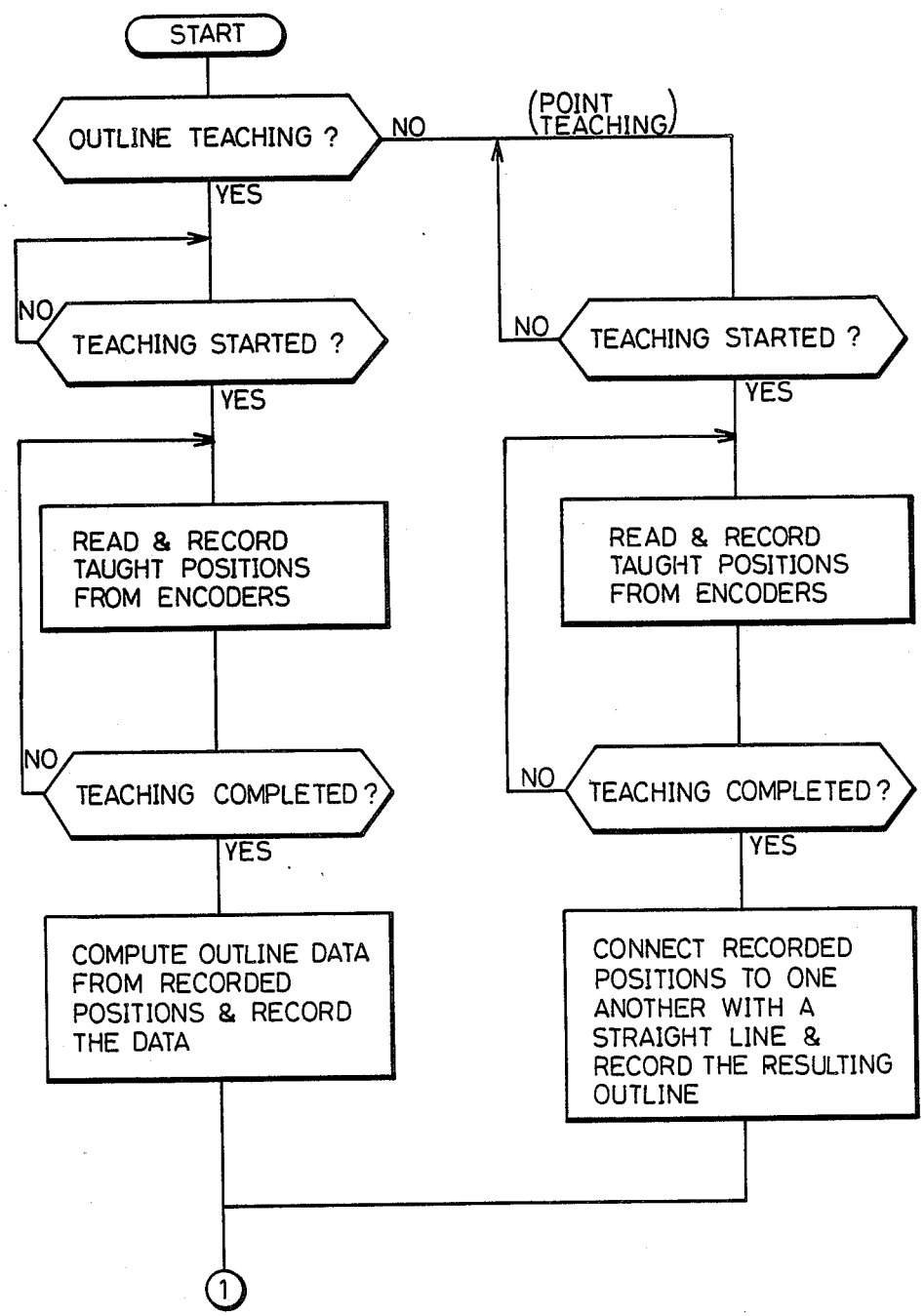
FIG. 5a and 5b are flow diagrams showing the teaching and playback routines for the robot of the invention.
Figure 5A:
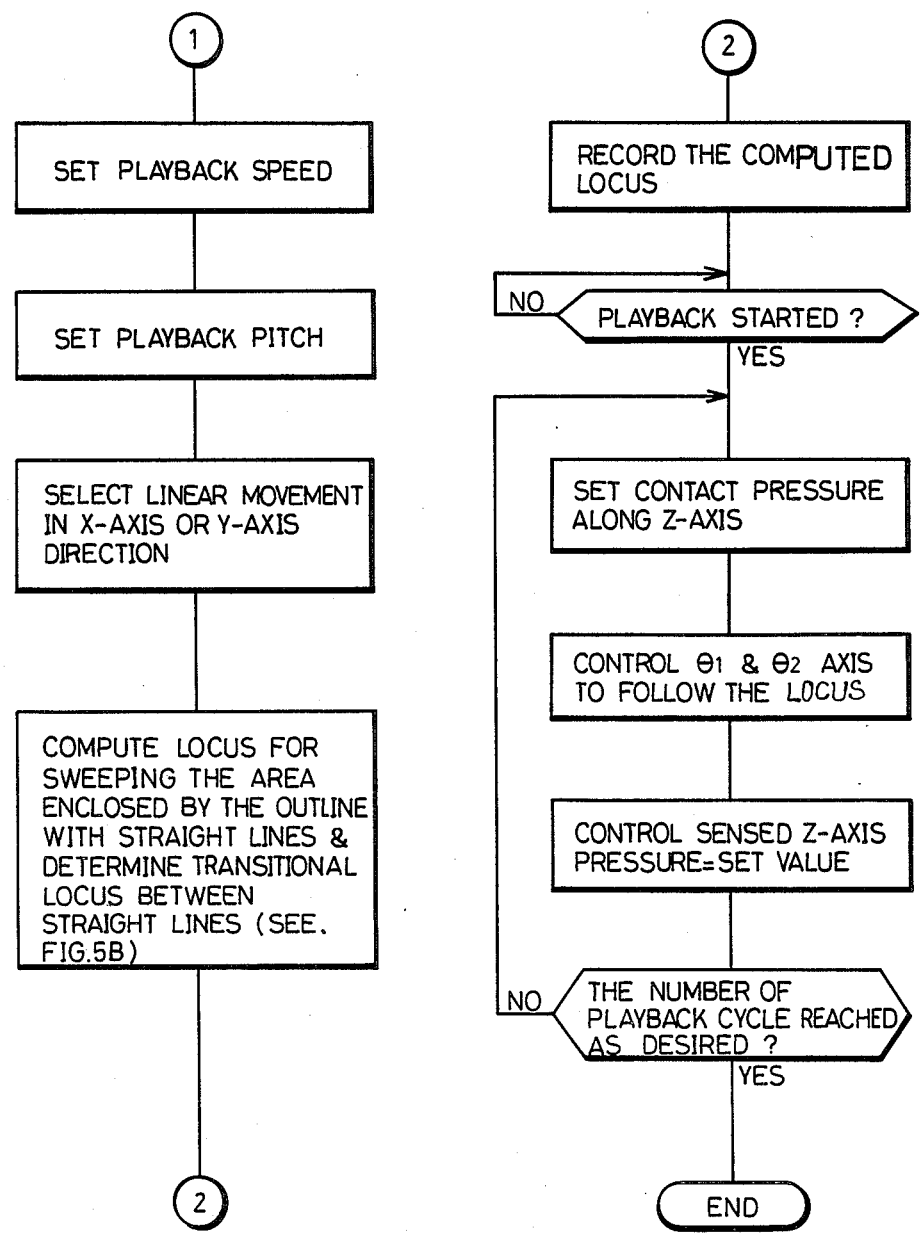
Figure 5B:
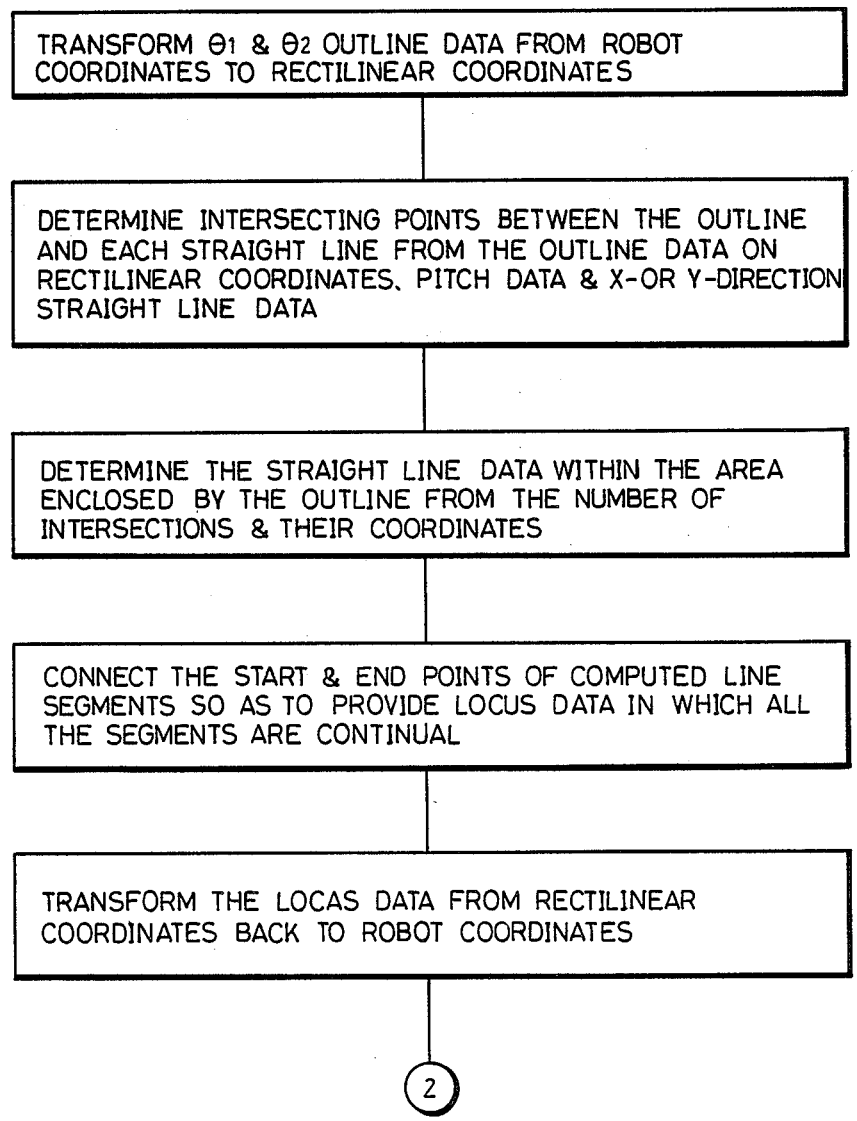

The teaching and playback routines for such an outline teaching mode are shown in FIGS. 5A and 5B. In FIG. 5A, the $\theta_1$ and $\theta_2$ axes are free and in regard to the Z-axis (direction of depth), the force applied to the sensor 36 is read and the speed of movement along the Z-axis is controlled according to the force. The details of the notatations in FIG. 5A are shown in FIG. 5B.

In the second embodiment of the present invention, a point teaching mode using the simple program input method is employed. Thus, the area to be polished is designated by teaching the robot appropriate points on the periphery of the workpiece and the operator designates these points by manipulating the free end of the second arm 2 to move the polishing tool 25. Then, for playback, the above points are interconnected with straight lines and the area enclosed by these lines is polished in the same manner as on the outline teaching mode.

Figure 4:
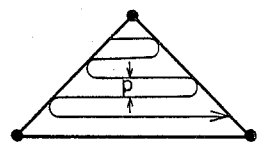
FIG. 4a and 4b are diagrams llustrating the playback routine for the robot on the point teaching mode.
Figure 4:
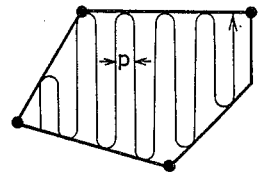

Examples of such a point teaching mode are shown in FIGS. 4A and 4B. FIG. 4A is an example of three-point teaching, in which the direction of movement, pitch p and the speed of movement are the same as those described for the outline teaching mode. FIG. 4B shows an example of five-point teaching. The teaching routine for such a point-teaching mode is shown in Fig. 5A.

In the illustrated embodiments, since the nuts of the high-lead ball screws are connected to the respective arms and servo-motors are connected to the ends of the corresponding threaded-shafts, the nuts are advanced in response to rotation of the servo-motors to thereby swing the arms independently, with the result that each ball screw functions as a speed reduction mechanism so that a necessary torque can be obtained with a compact servo-motor. Furthermore, since this is not a gear-type reducer, the backlash is so minimal that there is no rattling of the arms. This means that the microvibrating polishing tool performs its job with high accuracy. Furthermore, the operator needs only a small force in manipulating the free end of the second arm and teaching the robot. In addition, because the free ends of the arms do not rattle, the arms may be increased in length so as to cope with a large workpiece, for example a metal mold, so that it is not necessary to provide a mount on which the metal mold is positioned for polishing.

Furthermore, since all that is necessary is the operator teaches the outline or points on the surface of the area to be polished, the teaching of a wide polishing area can be simplified. On the other hand, since the program used is also a simple program comprising only the linear direction of movement, pitch between adjacent straight lines, and speed of movement as parameters, the delicate operations involving X-Y coordinates and setting circuitry which are often subject to errors in programming for an irregular outline such as that of a metal mold can be dispensed with.

What is claimed is:

1. In a direct-teaching and playback-type polishing robot comprising a polishing tool, means for moving said polishing tool in direction identified by cartesian X, Y and Z coordinates relative to a surface of a workpiece to be polished, and means for actuating said moving means, the improvement wherein said tool-moving means comprises:

a first arm pivotally mounted on a vertically standing cardinal shaft, a second arm pivotally mounted on a second shaft secured at a free end of said first arm, said second arm carrying said polishing tool at an end thereof and said second shaft being mounted in parallel to said cardinal shaft, and means for causing said first and second arms to swing independently about their respective shafts;

means for mounting said tool-moving means for slidable movement in the direction of the Z coordinate relative to the stationary base of said robot and workpiece; and wherein said actuating means comprises:

means for reading and storing data defining the outline of the surface of said workpiece to be polished in X and Y coordinates as taught by the operator when manipulating said polishing tool along said outline;

means for establishing a program for scanning the surface of said workpiece enclosed by said outline with said polishing tool based on said stored data at a predetermined scanning speed and pitch in a predetermined direction with respect to the X and Y coordinates, said program including data concerning a predetermined contact pressure to be exerted against the workpiece by the polishing tool in the direction of the Z coordinate;

computer-operated driving means for operating said tool-moving means in accordance with said program, and means for causing the movement of said tool-moving means in the direction of the Z coordinate relative to the workpiece by the sliding movement thereof relative to said stationary robot base in response to the undulation of said workpiece along each scanning path.

2. The polishing robot according to claim 1, wherein said means for causing said first and second arms to swing comprises a pair of horizontal high-lead ball screws mounting associated first and second nuts connected to said first and second arms, respectively, a servo-motor and a clutch operatively connected to an end of a threaded shaft extending from each of said high-lead ball screws in such a manner that operation of said servo-motor rotates the associated ball screw and advances the corresponding nut to swing the corresponding arm independently of the other arm.

3. The polishing robot according to claim 2, wherein said pair of horizontal high-lead ball screws are each pivotally carried by a vertically sliding member which allows sliding motion of said tool-moving means in the direction of the Z coordinate relative to the stationary base of the robot.

4. The polishing robot according to claim 1, wherein said outline data is established by manipulating the polishing tool to continually trace the periphery of the area of the workpiece to be polished.

5. The polishing robot according to claim 1, wherein said outline data is established by manipulating the polishing tool to teach the robot appropriate points on the periphery of the area to be polished as well as straight lines interconnecting adjoining pairs of said points.

6. In a direct-teaching and playback-type polishing robot comprising a polishing tool, means for moving said polishing tool in directions identified by cartesian X, Y and Z coordinates relative to a surface of a workpiece to be polished, and means for actuating said moving means, the improvement wherein said tool-moving means comprises:

a first arm pivotally mounted on a vertically standing cardinal shaft, a second arm pivotally mounted on a second shaft secured at a free end of said first arm, said second arm carrying said polishing tool at an end thereof and said second shaft being mounted in parallel to said cardinal shaft, and first and second horizontal high-lead ball screws having associated nuts connected by connecting means to said first and second arms, respectively, a servo-motor and a clutch operatively connected to an end of a threaded shaft extending from each of said high-lead ball screws in such a manner that rotation of said servo-motor advances the corresponding nut to swing the corresponding arm independently of the other arm, means for mounting said tool-moving means for slidable movement in the direction of the Z coordinate relative to both the stationary base of said robot and workpiece; and wherein said actuating means comprises:

means for reading and storing data defining the outline of the surface of said workpiece to be polished in X and Y coordinates as taught by the operator when manipulating said polishing tool along said outline, means for establishing a program for scanning the surface of said workpiece enclosed by said outline with said polishing tool based on said stored data at a predetermined scanning speed and pitch in a predetermined direction with respect to the X and Y coordinates, said program including data concerning a predetermined contact pressure to be exerted against the workpiece by the polishing tool in the direction of the Z coordinate, computer-operated driving means for operating said tool-moving means in accordance with said program, and means for causing the movement of said tool-moving means in the direction of the Z coordinate relative to the workpiece by the sliding movement thereof relative to said stationary robot base in response to the undulation of said workpiece along each scanning path.

7. The polishing robot of claim 6, wherein the connecting means includes a first lever fixed to the first arm and pivoted to the first ball screw, and wherein the connecting means further includes a pair of links for connecting the second arm to the second ball screw, the first link being pivotally connected to both the cardinal shaft and the second ball screw while the second link is pivotally connected to both the second ball screw and the second lever.

8. The polishing robot of claim 7, wherein the second arm is pivoted on a support shaft intermediate the ends of the second arm with the polishing tool located on one side of the supporting rod and the second link pivotally connected to the second arm on the other side of the supporting rod.

* * * * *